Oct. 26, 1954  C. W. MYERS  2,692,452
MINNOW BUCKET
Filed July 7, 1952
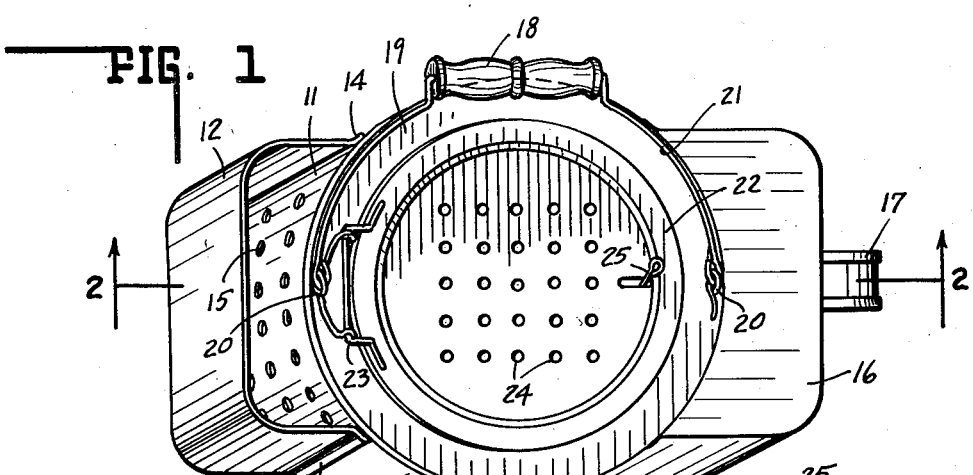
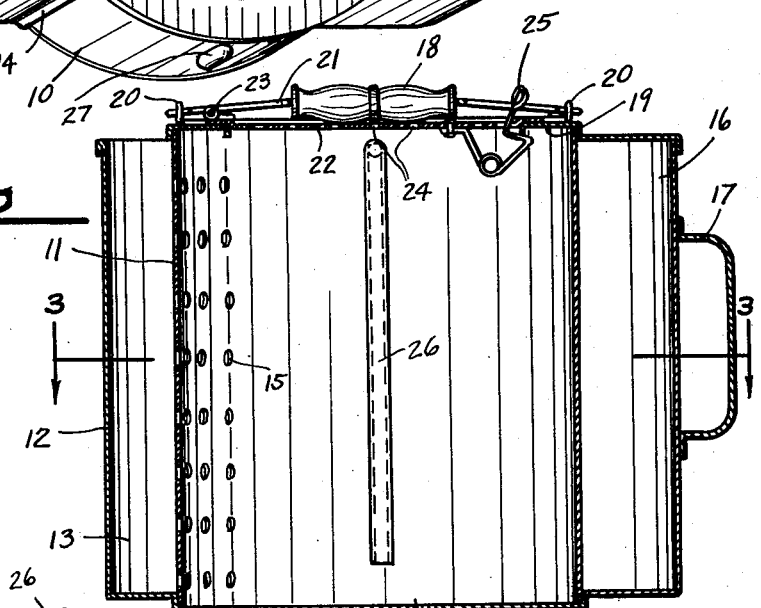
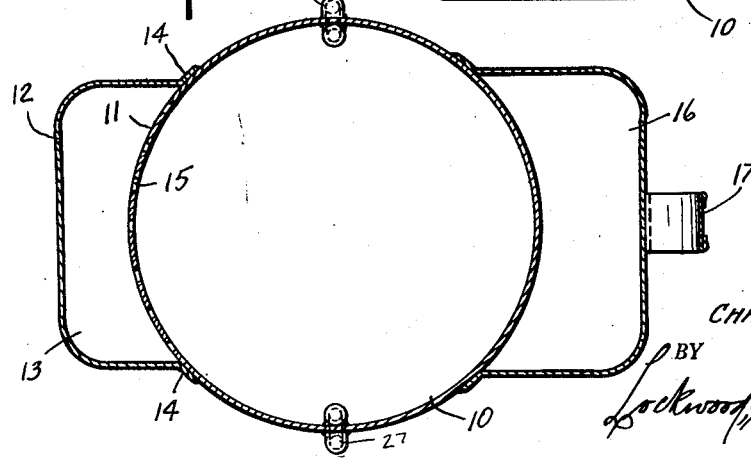
INVENTOR.
CHARLES W. MYERS.
BY
Lockwood, Galt, Woodard & Smith
ATTORNEYS.

Patented Oct. 26, 1954

2,692,452

UNITED STATES PATENT OFFICE 2,692,452

MINNOW BUCKET

Charles W. Myers, Clermont, Ind.

Application July 7, 1952, Serial No. 297,483

3 Claims. (Cl. 43—56)

This invention relates to a minnow bucket, and more particularly to a float type bucket comprising a single unit.

As is well known, the conventional type minnow bucket consists of two separate and independent parts, namely an outer shell or container and an inner perforated or porous compartment. The outer shell of such a bucket is used for carrying the necessary water to accommodate the minnows while they are being transported to the fishing location, whereas the inner compartment serves as a cage for the minnows after the fishing location is reached. Such conventional buckets are relatively cumbersome, complex and expensive. It is, therefore, the primary object of this invention to provide a bucket that will serve the dual purpose of transporting the minnows to a stream or lake, and acting as a floating cage for the minnows after the fishing location has been reached.

It is a still further object of this invention to provide a single unit minnow bucket which is characterized by a side float compartment and which eliminates or at least reduces the hazard of minnow injury which results from the use of the conventional buckets.

It is a still further object of the present invention to provide a single unit floating minnow bucket which is inexpensive yet durable and has a minimum number of parts.

It is a still further object of the present invention to provide a minnow bucket which may be drained with ease of all water when the supply of minnows is exhausted or after any remaining minnows are removed therefrom.

The full nature of the invention will be understood from the accompanying drawings and the following description and claims:

Fig. 1 is a top perspective view of the invention.

Fig. 2 is a vertical section view thereof taken on lines 2—2 of Fig. 1 in the direction of the arrows.

Fig. 3 is a transverse section view thereof taken on lines 3—3 of Fig. 2 in the direction of the arrows.

In the drawings an annular water and minnow housing or container is shown at 10, a segment 11 thereof being perforated as shown in Figs. 1 and 2. Enveloping the perforated segment of the container is the pour-out trough 12 formed by a wall 13 substantially U-shaped in cross section which is suitably secured to the wall of the container at 14 by welding or the like. As will be observed, the pour-out trough is open at the top but closed at the bottom and sides. The trough is in communication with the interior of the container through the apertures 15.

Formed on the opposite side of the container is the airtight float 16. As will be observed from Figs. 1 and 2, the device is substantially symmetrical although the float side thereof is slightly larger than the trough side. This is for the purpose of achieving substantial balance of the entire unit as it is being carried to the fishing location. The extra metal forming the float will to a certain extent offset the weight of the water disposed within the trough as well, of course, as the container. A handle 17 is suitably secured to the wall of the float compartment.

A second handle 18 is connected to the inwardly extending flange 19 formed at the top of the container. Conventional eyes 20 are secured to the flange to accommodate and receive the handle bail 21. When the unit is being transported to the fishing location the unit will, of course, be carried by the handle 18. Once, however, the fishing location is reached and the bucket submerged in the water, the handle 17 will be used. Furthermore, a rope or the like may be secured to that handle for the purpose of making certain that the bucket is not carried away a greater distance than desired from the fishing boat.

A closure 22 is pivotally secured at 23 to the aforementioned flange and is itself perforated as shown at 24. A latch 25 of resilient character is provided for the purpose of latching the closure in closed position.

A further feature of the invention resides in the provision of substantially J-shaped tubular elements 26 and 27. Each element is open ended and is suitably connected to the wall of the housing or cylindrical casing 10 in such manner that one open end of each element is exposed interiorly of the casing adjacent the bottom thereof while the other open end of each element is disposed exteriorly of the casing adjacent the closure end thereof. The respective arms of said elements are mounted in a plane substantially parallel to that of the wall of said casing. Thus each element is connected to the casing with the long arm of the J-shaped element disposed on the inside of the casing, and with the short arm located on the outside thereof. With this construction it is apparent that while the fisherman is trolling, the bait container or minnow bucket will reduce the drag upon the boat that would be present were there no avenue of escape for the water entering the apertures 24.

In operation, water and minnows are disposed within the container whereupon the unit may be carried in substantial equilibrium and balance by the handle 18. Once the fishing location is reached the unit may be submerged whereupon it will float at the desired level and may be retained in proximity to the boat by means such as a rope or the like connecting the handle 17 to the boat. When it is desired to remove a minnow from the bucket it is necessary only that the handle 17 be used to lift the bucket out to a point where the closure may be opened. At all times, however, there will be a sufficient amount of water in the container to make certain that the minnows are adequately provided for. As stated, once the supply of minnows is exhausted or any remaining minnows have been removed from the container, the water may be poured therefrom with ease through the pour-out trough. Furthermore, should it be desired at any time to increase the amount of water in the container it can be readily accomplished by submerging the trough end into a water supply.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A bait container comprising a substantially cylindrical casing having an open top, a perforated closure for said top hingedly connected to said casing, a pair of opposed substantially symmetrical and laterally extending members carried by said casing, one of said members comprising a pour-out trough in communication with the interior of said casing and having a length substantially coextensive with the height of said casing, the other of said members comprising an airtight float substantially coextensive in length with the height of said casing, and a handle connected to said casing adjacent the top thereof.

2. A bait container comprising a substantially cylindrical casing having an open top, a perforated closure for said top hingedly connected to said casing, a pair of opposed substantially symmetrical and laterally extending members carried by said casing, one of said members comprising a pour-out trough in communication with the interior of said casing and having a length substantially coextensive with the height of said casing, the other of said members comprising an airtight float having a length substantially coextensive with the height of said casing, said float member having a slightly larger area than that of said trough member, and a handle connected to said casing adjacent the top thereof.

3. A bait container comprising a substantially cylindrical casing having an open top, a perforated closure for said top, at least two open ended and substantially J-shaped tubular elements connected to the wall of said casing, one arm of each of said elements being disposed interiorly of said casing and the other arm of each of said elements being disposed exteriorly of said casing, the two arms of each element lying substantially parallel to the casing wall, a pair of opposed substantially symmetrical and laterally extending members carried by said casing and each having a length substantially coextensive with the height of said casing, one of said members comprising a pour-out trough in communication with the interior of said casing, the other of said members comprising an airtight float, and a handle connected to said casing at the top thereof.

References Cited in the file of this patent

UNITED STATES PATENTS

| Number | Name | Date |
| --- | --- | --- |
| 307,375 | Busche | Oct. 28, 1884 |
| 617,973 | Sulzbacher | Jan. 17, 1899 |
| 1,324,305 | Carrico | Dec. 9, 1919 |
| 1,801,117 | Smith | Apr. 14, 1931 |